(12) United States Patent
Fox et al.

(10) Patent No.: US 12,556,804 B2
(45) Date of Patent: Feb. 17, 2026

(54) POLICY FOR PREVENTING UNAUTHORIZED PHOTO CAPTURE

(71) Applicant: International Business Machines Corporation, Armonk, NY (US)

(72) Inventors: Jeremy R. Fox, Georgetown, TX (US); Martin G. Keen, Cary, NC (US); Kevin W. Brew, Niskayuna, NY (US); Alexander Reznicek, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 18/419,211

(22) Filed: Jan. 22, 2024

(65) Prior Publication Data

US 2025/0240518 A1    Jul. 24, 2025

(51) Int. Cl.
*H04N 23/63* (2023.01)
*G06F 21/60* (2013.01)

(52) U.S. Cl.
CPC ......... *H04N 23/632* (2023.01); *G06F 21/604* (2013.01)

(58) Field of Classification Search
None
See application file for complete search history.

(56) References Cited

U.S. PATENT DOCUMENTS

| | | | |
|---|---|---|---|
| 10,044,464 B1 * | 8/2018 | Bostick | F21V 33/0008 |
| 10,178,741 B1 * | 1/2019 | Shah | F21V 33/0076 |
| 10,915,995 B2 * | 2/2021 | Moloney | G06T 5/75 |
| 11,544,962 B2 | 1/2023 | Sobh et al. | |
| 2012/0260307 A1 | 10/2012 | Sambamurthy et al. | |
| 2021/0034741 A1 * | 2/2021 | Beveridge | G06N 3/09 |
| 2021/0157933 A1 * | 5/2021 | Turano | G06F 21/604 |
| 2022/0043890 A1 | 2/2022 | Choi | |
| 2022/0068058 A1 | 3/2022 | Kojima et al. | |

(Continued)

OTHER PUBLICATIONS

You, M., "An Adaptive Machine Learning Framework for Access Control Decision Making," Thesis, Institute for Sustainable Industries and Liveable Cities, Victoria University, Feb. 2022, 97 pages, retrieved from https://vuir.vu.edu.au/43688/1/YOU_Mingshan-Thesis_nosignature.pdf.

(Continued)

*Primary Examiner* — Cynthia Segura
(74) *Attorney, Agent, or Firm* — Zilka-Kotab, P.C.

(57) ABSTRACT

A computer-implemented method (CIM), according to one embodiment, includes enacting a first policy. Enacting the first policy includes collecting location data and camera data for a first user device. Enacting the first policy further includes causing a predetermined machine learning model to use the data to determine whether the first user device is authorized to perform an image capture at a current location of the first user device. In response to a determination that an output of the predetermined machine learning model indicates that the first user device is not authorized to perform the image capture at the current location, the first user device is restricted from performing the image capture. In response to a determination that the output of the predetermined machine learning model indicates that the first user device is authorized to perform the image capture, the first user device is allowed to perform the image capture.

20 Claims, 8 Drawing Sheets

(56) References Cited

U.S. PATENT DOCUMENTS

2022/0075989 A1* 3/2022 Kimhi .................. G06V 40/167
2022/0374130 A1 11/2022 Pu et al.

OTHER PUBLICATIONS

Jiang et al., "Risk and UCON?based access control model for healthcare big data," Journal of Big Data, 2023, pp. 1-28.
Kandala et al., "An Attribute Based Framework for Risk-Adaptive Access Control Models," Sixth International Conference on Availability, Reliability and Security (ARES), 2011, 6 pages, retrieved from https://www.semanticscholar.org/paper/An-Attribute-Based-Framework-for-Risk-Adaptive-Kandala-Sandhu/e79e2348bc6eeab9ec0a2a66c81f8c95bd5b6a77.
Lufei et al., "Adaptive Secure Access to Remote Services," IEEE International Conference on Services Computing, 2008, pp. 173-181.
Faaborg et al., "Security System with Authentication Code and Adaptive Photo Log," IP.com Prior Art Database, Technical Disclosure No. IPCOM000250874D, Sep. 11, 2017, 12 pages.
Anonymous, "Improved White Balance Based on Multiple Photos of Same Subjects," IP.com Prior Art Database, Technical Disclosure No. IPCOM000255937D, Oct. 24, 2018, 14 pages.
Anonymous, "Predicted Image-Capture Device Settings through Machine Learning," IP.com Prior Art Database, Technical Disclosure No. IPCOM000258052D, Apr. 3, 2019, 9 pages.
Anonymous, "Contextually Adaptive Camera Parameter Reconfiguration Optimality," IP.com Prior Art Database, Technical Disclosure No. IPCOM000265863D, May 20, 2021, 7 pages.
IBM, "Data privacy solutions," IBM, 2023, 10 pages, retrieved from https://www.ibm.com/data-privacy on Jan. 19, 2024.
SafePaaS, "Segregation of Duties Audit Handbook, ERP Access Controls Testing," SafePaaS, 2024, 21 pages, retrieved from https://www.safepaas.com/resources/Segregation_of_Duties_Handbook_for_ERP_Auditors.pdf.
"IBM Privacy Statement", IBM, Oct. 30, 2025, 22 pages, https://www.ibm.com/us-en/privacy.
IBM "Media Center", Oct. 30, 2025, 04 pages, https://newsroom.ibm.com/media-center-I1.

* cited by examiner

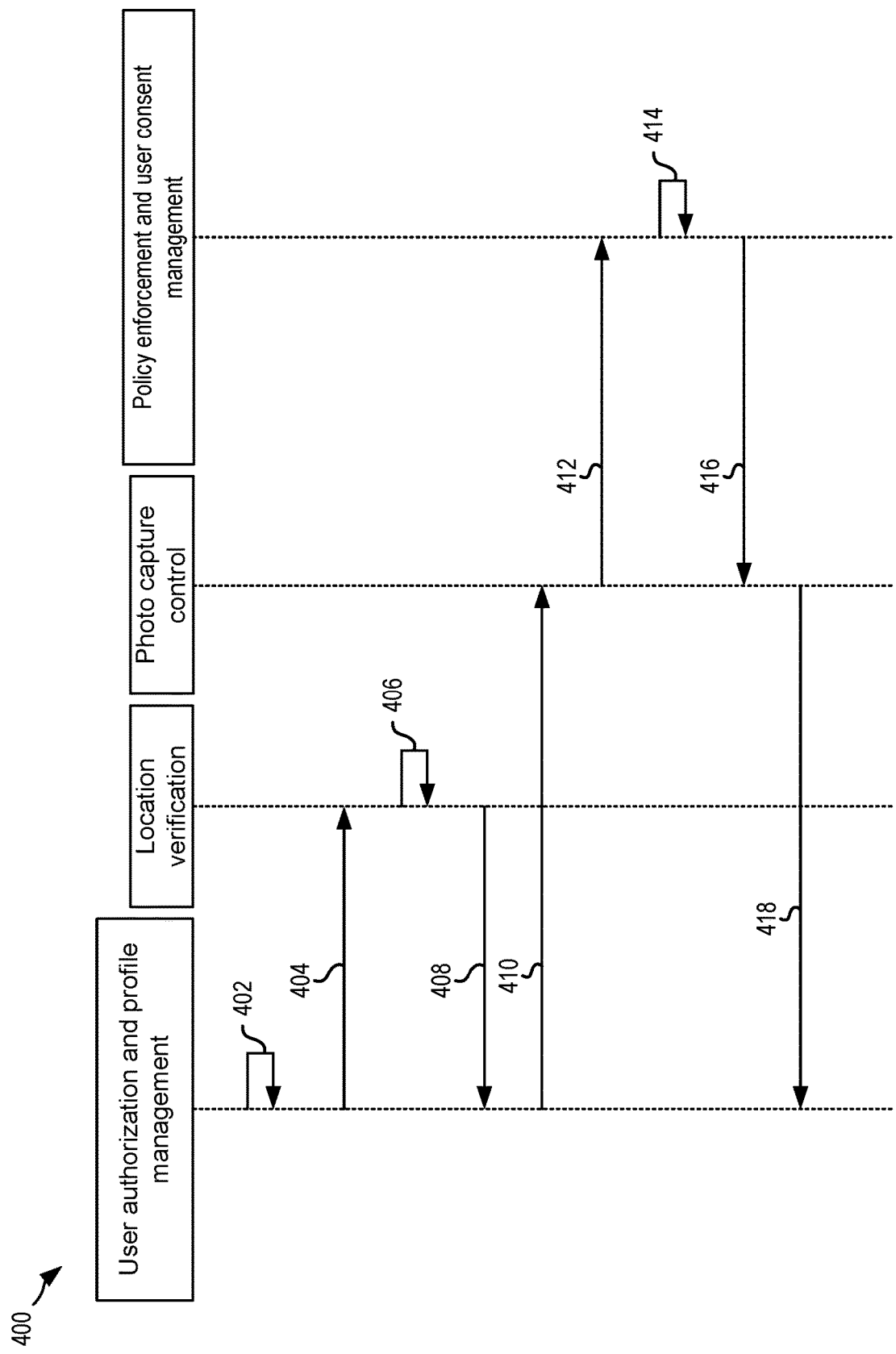

POLICY FOR PREVENTING UNAUTHORIZED PHOTO CAPTURE

BACKGROUND

The present invention relates to photo capture, and more specifically, this invention relates to photo capture in predetermined secure areas.

Photo capture involves the use of a device that includes a camera in order to capture a view of a scene that the camera is pointed at. Photos capture is often used to document an event that occurs within a geographical location, or a view of the geographical location itself. A photo of the photo capture is typically then stored to the device itself and/or migrated to another storage location, e.g., another physically paired device, cloud storage, etc.

SUMMARY

A computer-implemented method (CIM), according to one embodiment, includes enacting a first policy for preventing unauthorized photo capture in sensitive areas. Enacting the first policy includes collecting location data and camera data for a first user device, where the first user device is associated with a user profile of a first user. Enacting the first policy further includes causing a predetermined machine learning model to use the location data and the camera data to determine whether the first user device is authorized to perform an image capture at a current location of the first user device. In response to a determination that an output of the predetermined machine learning model indicates that the first user device is not authorized to perform the image capture at the current location of the first user device, the first user device is restricted from performing the image capture. In response to a determination that the output of the predetermined machine learning model indicates that the first user device is authorized to perform the image capture at the current location of the first user device, the first user device is allowed to perform the image capture.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is a flowchart of a method, in accordance with one embodiment of the present invention.

DETAILED DESCRIPTION

Figure 1:
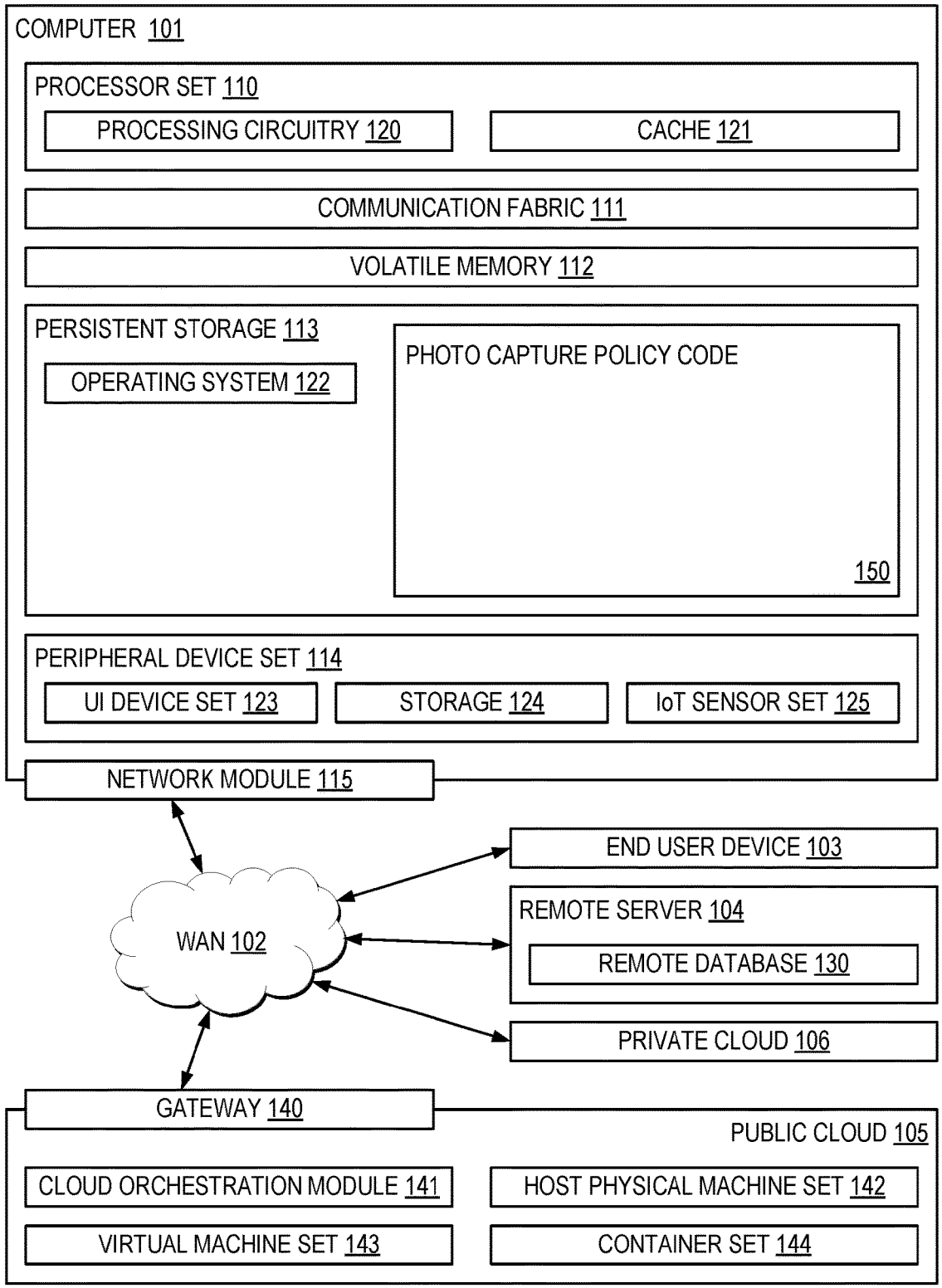
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for enacting a policy for selectively preventing photo capture in predetermined secure areas.

In one general embodiment, a CIM includes enacting a first policy for preventing unauthorized photo capture in sensitive areas. Enacting the first policy includes collecting location data and camera data for a first user device, where the first user device is associated with a user profile of a first user. Enacting the first policy further includes causing a predetermined machine learning model to use the location data and the camera data to determine whether the first user device is authorized to perform an image capture at a current location of the first user device. In response to a determination that an output of the predetermined machine learning model indicates that the first user device is not authorized to perform the image capture at the current location of the first user device, the first user device is restricted from performing the image capture. In response to a determination that the output of the predetermined machine learning model indicates that the first user device is authorized to perform the image capture at the current location of the first user device, the first user device is allowed to perform the image capture.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as photo capture policy code of block 150 for enacting a policy for selectively preventing photo capture in predetermined secure areas. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, photo capture involves the use of a device that includes a camera in order to capture a view of a scene that the camera is pointed at. Photos capture is often used to document an event that occurs within a geographical location, or a view of the geographical location itself. A photo of the photo capture is typically then stored to the device itself and/or migrated to another storage location, e.g., another physically paired device, cloud storage, etc.

Not taking photographs in secured areas such as labs or sensitive manufacturing areas is important for maintaining the security and integrity of confidential information and assets. These areas are often equipped with specialized equipment and technology that can be compromised by unauthorized photography, potentially leading to data breaches, intellectual property theft, and other security risks. Photographs taken in these areas may contain sensitive information or details about an organization's operations, which may be used for malicious purposes if the photographs are obtained by malicious actors that are willing to use the photographs to exploit the organization.

To prevent unauthorized photography in secured areas, organizations can attempt to implement strict policies and guidelines that govern the use of devices and recording equipment within these secure areas. These attempts may include techniques such as banning all forms of photography, requiring special permits or approvals for authorized photography, etc., to enforce these policies. Other techniques may include organizations providing training and education to employees on the risks and consequences of unauthorized photography, as well as the importance of maintaining confidentiality and security within relatively sensitive areas. However, these techniques ultimately do not ensure that photo capture does not occur within these areas, as people may still identify ways to perform unauthorized photo capture within the sensitive areas. Furthermore, some of these techniques are counterproductive to an organizations day to day operations that include performing selective photo capture within these secure areas, e.g., such as to document portions of research, document portions of a manufacturing process, to comply with government reporting regulations, etc. Accordingly, there is a longstanding need within the technical field of photo capture for techniques that ensure that photo capture attempts within a predetermined secure area are verified to be allowable before being allowed.

In sharp contrast to the deficiencies of the conventional approaches described above, the techniques of embodiments and approaches described herein may be used to protect assets, intellectual property, and confidential information from unauthorized photography in secure areas, while selectively allowing authorized photography in these secured areas. This not only helps maintain the security and integrity of sensitive information, but also enables the demonstration of a commitment to ethical behavior and responsible conduct within an organization. These novel techniques furthermore specifically addresses a critical need for organizations to manage and secure photo capture in sensitive areas while ensuring compliance with company policies and security protocols. This problem is not limited to any specific industry, but rather affects all organizations that rely on confidentiality and security to protect their assets, intellectual property, and customer data. To mitigate this problem, the techniques described herein provide a solution that leverages a Separation of Duties (SOD) matrix, location services, and machine learning algorithms to control access to certain features on devices based on user roles and responsibilities. In some approaches, these techniques also utilize various enabling technologies, such as consideration for smart traditional cameras, smart glasses, and smartphones, to capture photos in secured areas within policy.

The techniques described herein may be underpinned by several underlying technologies that enable the solution to work seamlessly across different industries and use cases. Depending on the approach, these technologies include machine learning algorithms, location services, and enabling technologies such as smart traditional cameras, smart glasses, smartphones, etc. By leveraging these technologies, an application specification of the techniques described herein is able to provide a relatively robust and scalable solution for managing and securing photo capture in predetermined sensitive areas.

Ultimately, the techniques described herein aim to solve the problem of unauthorized photo capture in secured areas, which can lead to data breaches, intellectual property theft, and other security risks which all have the potential for compromising performance of computer systems and other infrastructure associated with the predetermined secure areas. The solution described herein addresses this problem by implementing a SOD matrix, location services, and machine learning algorithms to control access to certain features on devices based on user roles and responsibilities. By providing a seamless and scalable solution that integrates with existing information technology (IT) infrastructure, the application specification of techniques described herein enables organizations to secure photo capture processes while maintaining compliance with company policies and security protocols.

Figure 2A:
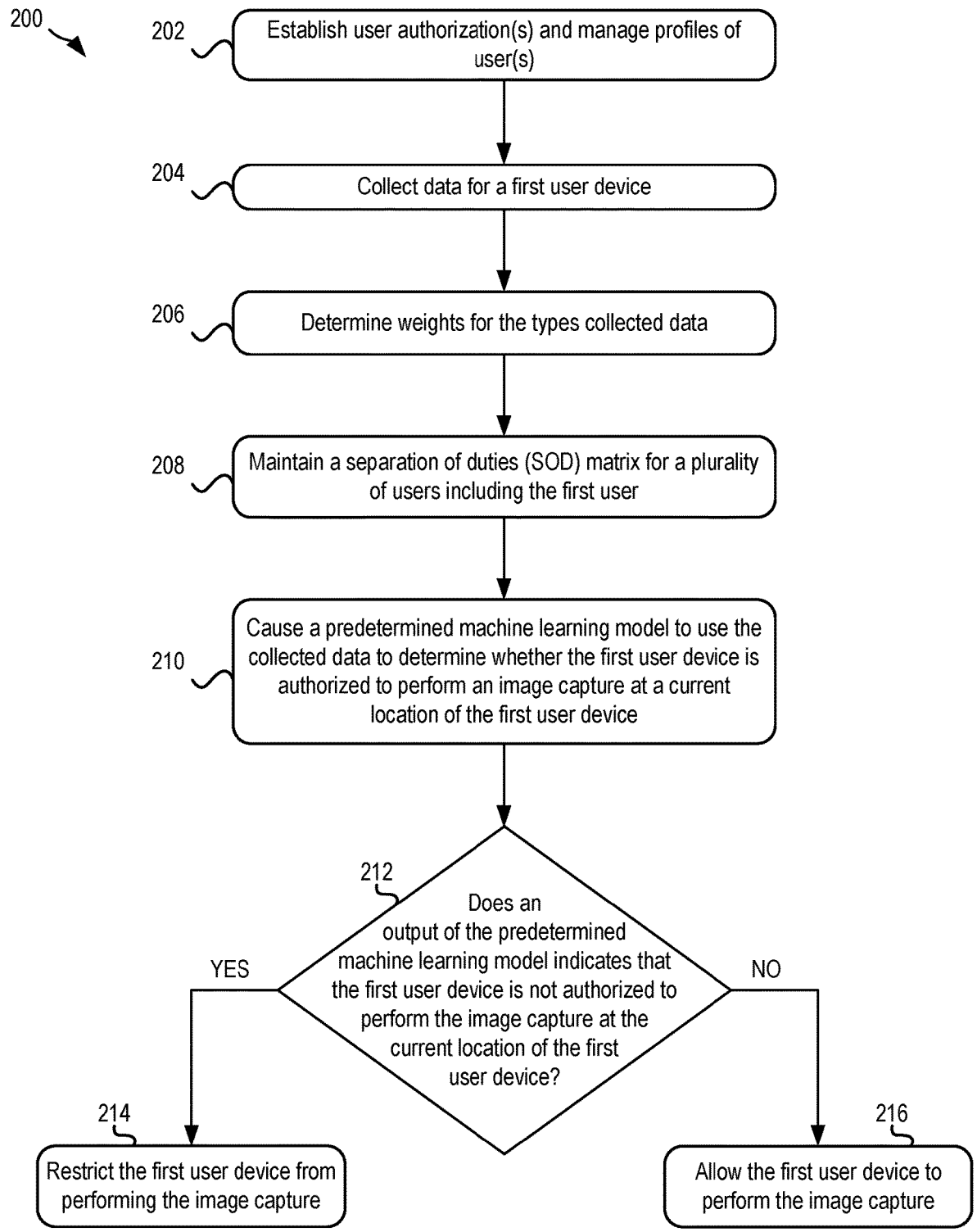
FIG. 2A is a flowchart of a method, in accordance with one embodiment of the present invention.

Now referring to FIG. 2A, a flowchart of a method 200 is shown according to one embodiment. The method 200 may be performed in accordance with the present invention in any of the environments depicted in FIGS. 1-4, among others, in various embodiments. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in any location and/or environment. However, in some preferred approaches, method 200 is performed in an environment that includes one or more predetermined secure areas. For context, a predetermined secure area may, for the purpose of embodiment and approaches described herein, include an area that preferably is subject to viewing and/or access only by authorized people. For example, a predetermined secure area may, in some approaches, be the location at which a predetermined private process occurs, e.g., a process associated with a trade secret. Accordingly, using the techniques described herein, photo capture that occurs within such predetermined secure areas may be controlled.

It may also be noted that, in some approaches, method 200 includes operation(s) for enacting a first policy for preventing unauthorized photo capture in sensitive areas. In other words, one or more of the operations of FIG. 2A may be performed for enacting the first policy.

Figure 2B:
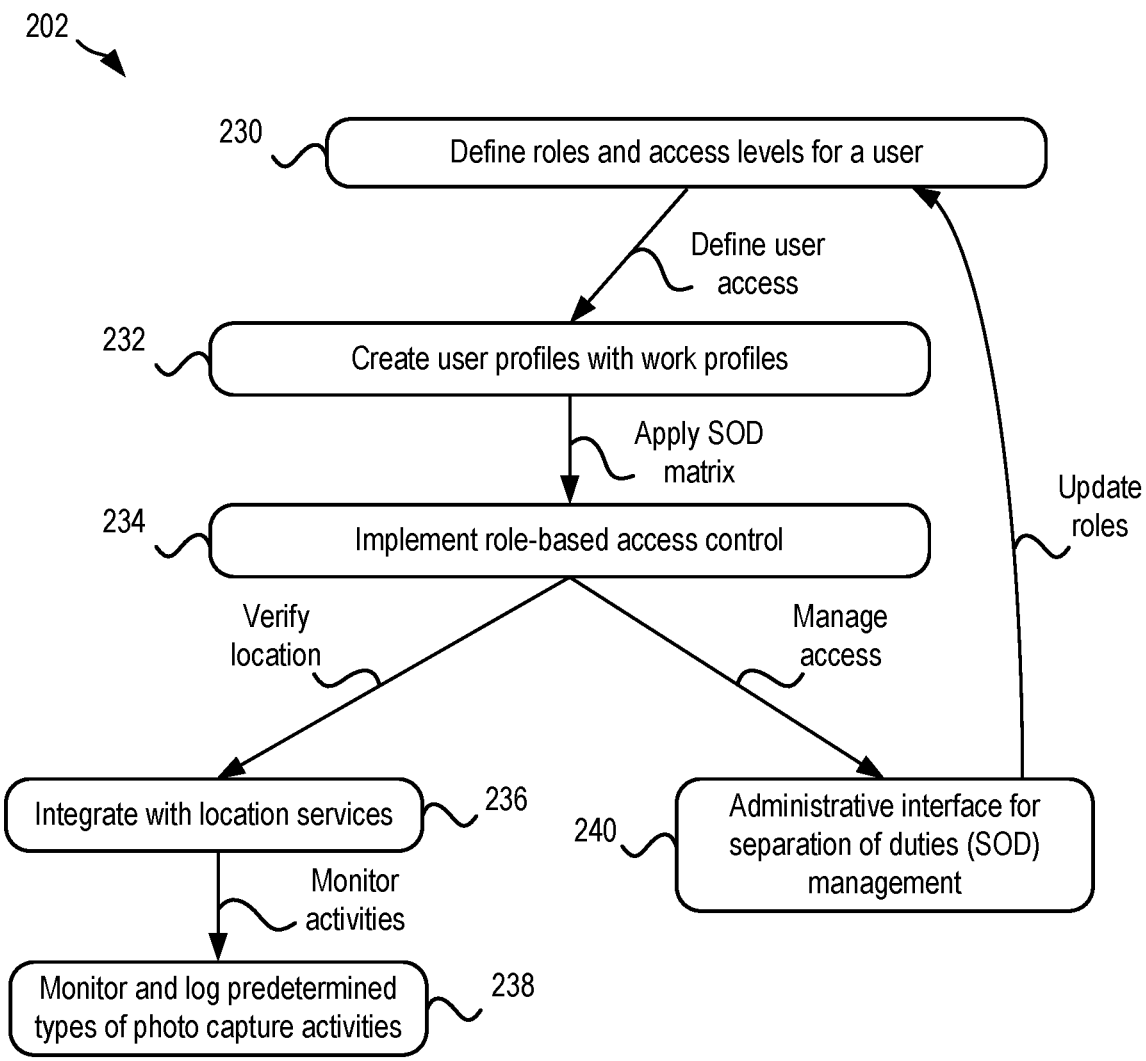
FIG. 2B is a flowchart of sub-operations of an operation of the flowchart of FIG. 2A, in accordance with one embodiment of the present invention.

In some approaches, enacting the first policy includes establishing user authorization(s) and managing profiles of user(s), e.g., see operation 202. For context, the establishment of user authorizations and management of profiles of users may include performing one or more sub-operations to establish baseline rules and roles for one or more users that may access and/or attempt to access a predetermined secure area. This initial establishment of user authorizations and management of profiles of users may be important for defining different permissions for different types of users that may access and/or attempt to access a predetermined secure area. Looking to FIG. 2B, exemplary sub-operations of establishing user authorization(s) and managing profiles of user(s) are illustrated in accordance with one embodiment, one or more of which may be used to perform operation 202 of FIG. 2A. However, it should be noted that the sub-operations of FIG. 2B are illustrated in accordance with one embodiment which is in no way intended to limit the invention.

Sub-operation 230 includes defining roles and access levels. In some approaches, these roles and access levels may be defined on a user-basis to outline specific roles within a predetermined organization associated with the users, e.g., an organization that the users work for, an organization associated with a secure location that the user(s) are visiting, etc. More specifically, in some approaches, the roles and access levels may include information that is included in and/or aligns with a SOD matrix, and more specifically, information that details which users are authorized to capture photos in which locations, and under what circumstances the users are authorized to capture such photos.

Sub-operation 232 includes creating user profiles with work profiles. In some approaches, creating user profiles with work profiles includes designing user profiles that are linked to job functions of the users, and differentiating permissions of the different users based on work and/or personal profiles. In some approaches, these permissions may allow access to various containers based on a determined physical location of the users. These user profiles may, in some approaches, be used to determine whether users are authorized to perform photo captures in predetermined secure areas as will be described in greater detail elsewhere herein.

Sub-operation 234 includes implementing role-based access control (RBAC). In some approaches, implementing RBAC includes utilizing the SOD matrix to set up RBAC, which may be used to thereafter control the ability of users to capture photographs in different secured areas based on their respective roles and responsibilities.

Sub-operation 236 includes integrating with location verification services and/or components. In other words, in some approaches, a location framework and infrastructure may be established and/or paired in order to allow the location and/or behavior of user devices to be tracked. In some approaches, this includes collaborating with location verification components to factor in the physical locations of users and thereby ensure that permissions align with presence in predetermined authorized areas. It should be noted that, any tracking and/or monitoring of users and/or user devices described herein, in addition to the analysis and/or gathering of user data, is preferably only performed subsequent to gaining explicit permission from users to do so, e.g., an opt-in clause. The users are thereafter free to withdraw such permission at any time.

Sub-operation 238 includes establishing infrastructure for monitoring and logging photo capture activities. In some approaches, establishing this infrastructure includes assigning components instructions to implement real-time monitoring and logging specifically for photo capture activities in secured areas in order to provide traceability and accountability of actions performed within these areas.

Sub-operation 240 includes providing an administrative interface for SOD management. In some approaches, in order to provide such an interface, method 200 may include developing an interface that allows administrators to manage, e.g., initiate data input, the SOD matrix, user roles, and permissions for photographic image capture within specified secured areas. Based on these entries, roles of the specific users that may access and/or attempt to access secure areas may be updated, e.g., see logical path "Update roles".

In some approaches, defining roles and access levels may include establishing infrastructure that may be used with the infrastructure established in the sub-operations described above. For example, in some of these approaches, machine learning algorithms may be sourced. These algorithms may be ones that are configured to use and/or be instructed to use anomaly detection to identify unauthorized access attempts or unusual user behavior. An application of such algorithms is described elsewhere below. In some approaches, APIs may be used such as authentication and authorization APIs, e.g., OAuth 2.0, OpenID Connect, LDAP, etc., for secure user validation. IT standards may additionally and/or alternatively be determined for applying in method 200. Depending on the use case, these IT standards may include security standards such as RBAC and SOD principles, TLS for secure communication, ISO/IEC 27001 for information security management, etc.

With reference again to FIG. 2A, in some approaches, enacting the first policy includes collecting data for a first user device, e.g., see operation 204. In some approaches, the first user device is associated with a user profile of the first user, e.g., the first user device is known to be used by and/or owned by the first user. Looking to FIG. 2C, exemplary sub-operations of collecting data for the first user device are illustrated in accordance with one embodiment, one or more of which may be used to perform operation 204 of FIG. 2A. However, it should be noted that the sub-operations of FIG. 2C are illustrated in accordance with one embodiment which is in no way intended to limit the invention.

Figure 2C:
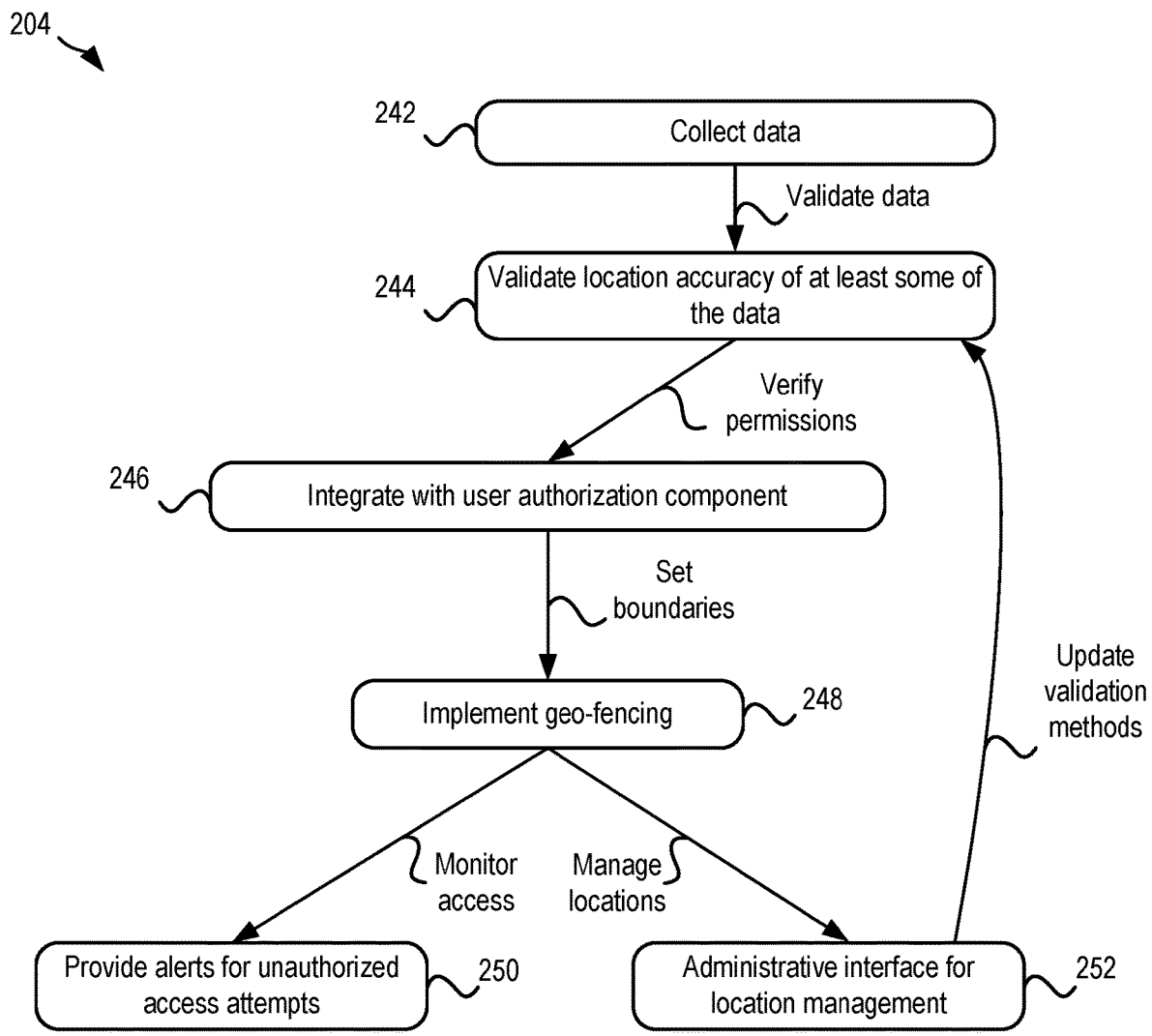
FIG. 2C is a flowchart of sub-operations of an operation of the flowchart of FIG. 2A, in accordance with one embodiment of the present invention.

With reference now to FIG. 2C, in some approaches, enacting the first policy includes collecting location data and camera data for a first user device, e.g., see operation 204. Depending on the use case, the location data and the camera data may, in some approaches, be captured using an application installed on the first user device. In some other approaches, the data may additionally and/or alternatively be captured by another device, e.g., such as a device that is observing the first user device, a device that receives performance metrics from the first user device, etc., and provided to a device performing method 200. In some other approaches, the location data may be retrieved from various sources such as military-grade GPS, SSID by location, or other location services.

The location data may include a geographical position system (GPS) location of the first user device, in some approaches. In some other approaches, the location data may additionally and/or alternatively include a location of the first user device within a predetermined building, e.g., which room the first user device is in, which room the first user device is approaching an entry of, which floor of a predetermined structure the first user device is on, etc. The location data may additionally and/or alternatively include a location of the first user device with respect to a predetermined object of a predetermined secure process, e.g., a proximity to a predetermined manufacturing component, whether the first user device is within a direct line of sight of a predetermined manufacturing component and/or a product being produced during a predetermined manufacturing process, etc.

The camera data may, in some approaches, include data that indicates whether the first user device is currently being touched by the first user, e.g., sensory data. This data may be useful for determining whether the first user that is associated with the first user device is relatively readily capable of attempting an image capture. The camera data may additionally and/or alternatively include data that indicates whether an application of a predetermined type is open on the first user device such as, e.g., an application that is capable of being used to perform an image capture. In yet another approach, the camera data may additionally and/or alternatively include data that indicates whether a display of the first user device is on, e.g., thereby likely indicating that the first user is actively using the first user device.

Behavior data associated with the first user may additionally and/or alternatively be collected, e.g., see sub-operation 242. In some approaches, the behavior data details a degree that the first user complies with predetermined policies of a predetermined company. Accordingly, in some illustrative examples, the behavior data may indicate, e.g., whether the first user has previously engaged in unlawful behavior, whether the first user has previously been admonished for attempting to and/or successfully performing photo capture(s) in predetermined secure areas, whether the first user has previously been determined to refuse to adhere to the first policy, etc. This information may be used, e.g., by a predetermined machine learning algorithm to determine whether the first user should be allowed to perform a photo capture in one or more predetermined secure areas.

At least some of the collected data may be used in a predetermined data validation process. For example, in some approaches, a predetermined location accuracy validation process may be performed, e.g., see sub-operation 244. The predetermined location accuracy validation process may include implementing multiple predetermined means of verification of a type that would become apparent to one of ordinary skill in the art after reading the descriptions herein to ensure that the reported location of the first user device and/or the first user is accurate and not manipulated. In some approaches, this process may include the possibly of using cross-referencing with other location services.

A predetermined user authorization component may optionally be integrated into method 200, e.g., see sub-operation 246. This optional integration may, in some approaches, include collaborating with the user authorization component to ensure that the collected location data aligns with permissions of the first user for photo capture in predetermined secured areas. In other words, in response to a determination that a predetermined secure area does not align with permissions of the user, the first user device that is associated with the first user may not be allowed to perform a photo capture while within a predetermined proximity of the predetermined secure area.

Collecting location data associated with the first user device (see operation 204 of method 200) may additionally and/or alternatively include implementing geo-fencing of a type that would become apparent to one of ordinary skill in the art after reading the descriptions herein, e.g., see sub-operation 248. Implementing geo-fencing may include setting up geo-fencing for secured areas, e.g., the boundaries of a predetermined secure area, to define precise boundaries within which specific policies and rules of the techniques described herein apply. This geo-fencing may, in some approaches, be established by monitoring access of the predetermined secure area and generating and/or providing alerts for determined unauthorized access events, e.g., see sub-operation 250. In response to a determination that a photo capture is attempted using the first user device for outside authorized locations, real-time alerts may be generated and/or output to notify administrators. An administrative interface for location management may also be established, e.g., see sub-operation 252, which may be an interface for administrators to manage location boundaries, permissions, and validation, e.g., see update logical path "update validation methods".

In some approaches, additional infrastructure that may be used for collecting data associated with operation 204 may include one or more types of APIs, e.g., geolocation APIs that are configured to gather precise location data. Predetermined types of IT standards may also be applied to the process, e.g., W3C geolocation API specifications and other relevant geographic information system (GIS) standards.

With reference again to FIG. 2A, method 200 includes causing a predetermined machine learning model to use the collected data to determine whether the first user device is authorized to perform an image capture at a current location of the first user device, e.g., see operation 210. It should be noted that the type of data that is used to determine whether the first user device is authorized to perform an image capture depends on the use case and the type of data that is collected. For example, the predetermined machine learning model may be caused to use any one or more of the location data, the camera data, the behavior data, etc.

The predetermined machine learning model is preferably configured to apply one or more of the types of policies described above that are based on whether the first user is authorized to perform a photo capture in the current location of the first user device (where the currently location of the first user device is determined from the collected data). Accordingly, causing the predetermined machine learning model to use the collected data to determine whether the first user device is authorized to perform an image capture may, in some approaches, include inputting the one or more types of the collected data to the predetermined machine learning model.

In some approaches, the predetermined machine learning model is configured to apply different predetermined weights to the different types of weights for the determination of whether the first user is authorized to perform a photo capture in the current location of the first user device. This way, a given user and/or user device may have associated data that would not otherwise allow for a photo capture to be performed but for a weight assigned to that data being relatively smaller than a weight applied to other types of data associated with the given user and/or user device being relatively greater. While applying the weights to the determination of whether or not to allow a photo capture to be performed, in some approaches a predetermined score must be reached in order for the photo capture to be allowed, e.g., where the weights are decimals that impact a determined scoring of each of the types of data.

In some approaches, in order to apply the weighting described above to the first policy, enacting the first policy may include determining a first weight for the location data, determining a second weight for the camera data, determining a third weight for the behavior data, and so forth for each of the types of data that are collected, e.g., see operation 206. In some approaches, these weights may be determined based on preferences that are received, e.g., from a user device used by an administrator. Each of the weights are preferably different from one another, in some approaches. Furthermore, method 200 may include causing the predetermined machine learning model to apply the weights to the different types of data for determining whether the first user device is authorized to perform the image capture.

In some approaches, the predetermined machine learning model is configured to use a maintained SOD matrix for the determination of whether the first user is authorized to perform a photo capture in the current location of the first user device. Accordingly, method 200 may include maintaining a SOD matrix for a plurality of users including the first user, e.g., see operation 208. The separation of duties matrix preferably defines user roles and authorized responsibilities on a task by task basis for the plurality of users. This way, the predetermined machine learning model may be able to determine whether a current use of the first user device falls within roles and authorized responsibilities of a user and/or user device that is being evaluated. In approaches in which such a SOD matrix is maintained, method 200 may include causing the predetermined machine learning model to use the SOD matrix for determining whether the first user device is authorized to perform the image capture.

Figure 2D:
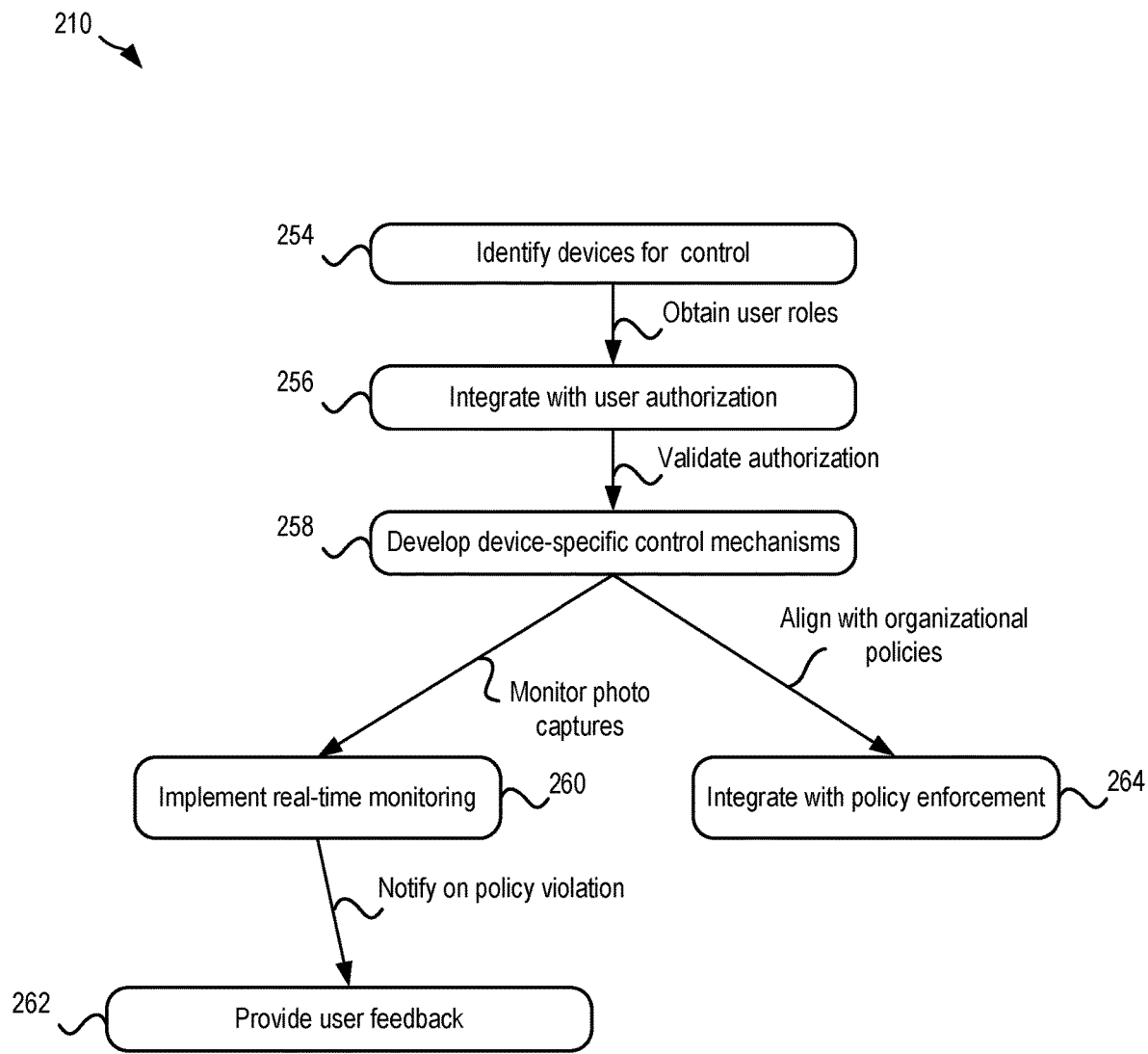
FIG. 2D is a flowchart of sub-operations of an operation of the flowchart of FIG. 2A, in accordance with one embodiment of the present invention.

In some approaches, the predetermined machine learning model is configured to perform predetermined photo capture control subprocess, which will now be described below. Looking to FIG. 2D, exemplary sub-operations of performing a photo capture control subprocess (that includes causing a predetermined machine learning model to use the collected data to determine whether the first user device is authorized to perform an image capture) are illustrated in accordance with one embodiment, one or more of which may be used to perform operation 206 of FIG. 2A. However, it should be noted that the sub-operations of FIG. 2D are illustrated in accordance with one embodiment which is in no way intended to limit the invention.

In some approaches, the photo capture control subprocess includes identifying devices for controlling, e.g., see sub-operation 254. In other words, in some approaches, the predetermined machine learning model may be informed (via the input) and/or determine all devices (such as the first user device) that must be controlled within the predetermined secured areas, e.g., a list of user devices of interest. These user devices may include, e.g., smartphones, smart glasses, smart traditional cameras, etc.

An integration may be performed with user authorization and profile management, e.g., see sub-operation 256. This step may include ensuring that predetermined photo capture control component receive user authorization and location verification information to thereby allow the components to activate or deactivate photo capturing functionalities on the user devices of interest using user device-specific control mechanisms of a type that would become apparent to one of ordinary skill in the art after reading the descriptions herein, e.g., see sub-operation 258.

It should be noted that an infrastructure associated with performing such a subprocess may, in some approaches, include predetermined algorithms computation components. For example, such components may, in one or more of such approaches, be configured to use convolutional neural networks (CNNs) for performing image analysis and reinforcement learning for dynamic policy enforcement. Such infrastructure may be used to implement real-time monitoring for policy compliance, e.g., see sub-operation 260. In other words, in some approaches, photo capture activities may be monitored in real time to make sure that the activities are compliant with the predetermined policies, and each of the activities may be logged for future reference. As a result of performance of such monitoring, user feedback on policy violations may optionally be provided to user devices associated with a user that is in violation of such policies, e.g., see sub-operation 262. For example, in response to a determination, e.g., by the predetermined machine learning model, that a user attempts an unauthorized photo capture, immediate feedback and possibly guidance on how to comply with policy may be provided to an associated user device, e.g., see sub-operation 262. In contrast, the infrastructure associated with performing such the subprocess may integrate with policy enforcement and user consent management by collaborating with components to ensure alignment with overall organizational policies and user agreements, e.g., see sub-operation 264.

The infrastructure associated with the sub-process described above may, in some approaches, additionally and/or alternatively include device control APIs, e.g., camera APIs and similar platform-specific APIs to manage photo capture capabilities across different user devices. Furthermore, these APIs may include location verification APIs such as location APIs and location services to cross-check physical locations of users with the permissions set in user authorization and profile management components described elsewhere herein, e.g., see FIG. 2B. The infrastructure may, in some approaches, additionally and/or alternatively consider device management standards such as mobile device management (MDM) and enterprise mobility management (EMM) standards for comprehensive control over different user device types.

With reference again to FIG. 2A, method 200 includes determining whether an output of the predetermined machine learning model indicates that the first user device is not authorized to perform the image capture at the current location of the first user device, e.g., see decision 212. In response to a determination that an output of the predetermined machine learning model indicates that the first user device is not authorized to perform the image capture at the current location of the first user device, e.g., as illustrated by the "YES" logical path of decision 212, the first user device is restricted from performing the image capture, e.g., see operation 214. In some approaches, the first user device is restricted from performing the image capture by causing an application that the first user device opts into to restrict functionality of all cameras of the first user device, e.g., a front facing camera, a back facing camera, a camera device paired with the first user device, etc. In some other approaches, a jamming signal is caused to be broadcast, e.g., by issuing an instruction to a predetermined jamming component, in order to interrupt functionality of the first user device and thereby restrict the first user device from performing the image capture. In yet some other approaches, a physical component that is paired with and/or connected to the first user device is caused to at least temporarily cover the lens of the first user device in order to restrict the first user device from performing the image capture. Furthermore, restricting the first user device from performing the image capture may additionally and/or alternatively include causing a predetermined type of blurring to be applied to a background of an image displayed on a display of the first user device.

In contrast, in response to a determination that an output of the predetermined machine learning model indicates that the first user device is authorized to perform the image capture at the current location of the first user device, e.g., as illustrated by the "NO" logical path of decision 212, the first user device is allowed to perform the image capture, e.g., see operation 216. Techniques for allowing the first user device to perform the image capture include, e.g., not causing one of the preventative techniques described above to occur, which may include stopping one of the blocking techniques described above. For example, allowing the first user device to perform the image capture include, e.g., causing the jamming component to stop broadcast of the jamming signal, etc.

It should be noted that, in some approaches, in response to a determination that the first user device is not within a secure area, the first user device may be allowed to freely perform photo captures. For example, in one or more of such approaches, in response to a determination that the current location of the first user device is in an unrestricted area, the first user device is authorized to perform the image capture at the current location of the first user device. In some approaches, logic described herein with respect to the predetermined machine learning model evaluating the collected data is only performed in response to a determination that the first user device and/or the first user is approaching and/or has entered a predetermined secure area, e.g., in order to reduce computational I/O operations. In contrast, in some approaches, such evaluation may include active monitoring of the location of the first user device and/or the first user, and therefore be ongoingly performed.

Use case environments in which method 200 may be performed, in some preferred approaches, include a manufacturing and/or research process. In one or more of such approaches, determining whether the first user device is authorized to perform the image capture at the current location of the first user device may include: tracking progress of a predetermined process that occurs within a first secure area, e.g., a trade secret process, a classified research process, etc. During this process, the predetermined machine learning model may be configured to evaluate authorization of the first user and/or first user device from the SOD matrix in order to determine whether a portion of the process that is currently being performed is one that may be captured by an image capture performed by the first user device. For example, the first user device may be allowed to perform the image capture during a first portion of the predetermined process in response to the determination that the output of the predetermined machine learning model indicates that the first user device is authorized to perform the image capture at the current location. In contrast, the first user device may not be allowed to perform the image capture during a remaining portion of the predetermined process, e.g., based on an evaluation of collected information maintained in the SOD matrix that is evaluated by the predetermined machine learning model.

Use cases of the techniques described herein may consider that secure areas may be accessed by a plurality of different users and associated user devices over time, e.g., visitors, inspectors, workers, etc. Because of this, method 200, in some approaches, includes selectively enacting the first policy. For example, in one or more of such approaches, enacting the first policy may include outputting an invitation for enrolling the first user device with the first policy in response to a determination that the current location of the first user device is within a predetermined proximity to a first secure area. Access to within the first secure area may optionally be controlled and based on whether user devices entering into the first secure area have enrolled in the first policy. For example, in response to a determination that the first user device is enrolled with the first policy, the first user device may be allowed within the first secure area, e.g., doors into the first secure area are unlocked. In contrast, in response to a determination that the first user device is not enrolled with the first policy, the first user device may be prevented to enter within the first secure area, e.g., doors into the first secure area remain locked. By providing real-time monitoring of user activity and compliance with company policies, the techniques described herein enable organizations to protect assets, intellectual property, and customer data from unauthorized photo capture in these predetermined sensitive areas.

Figure 2E:
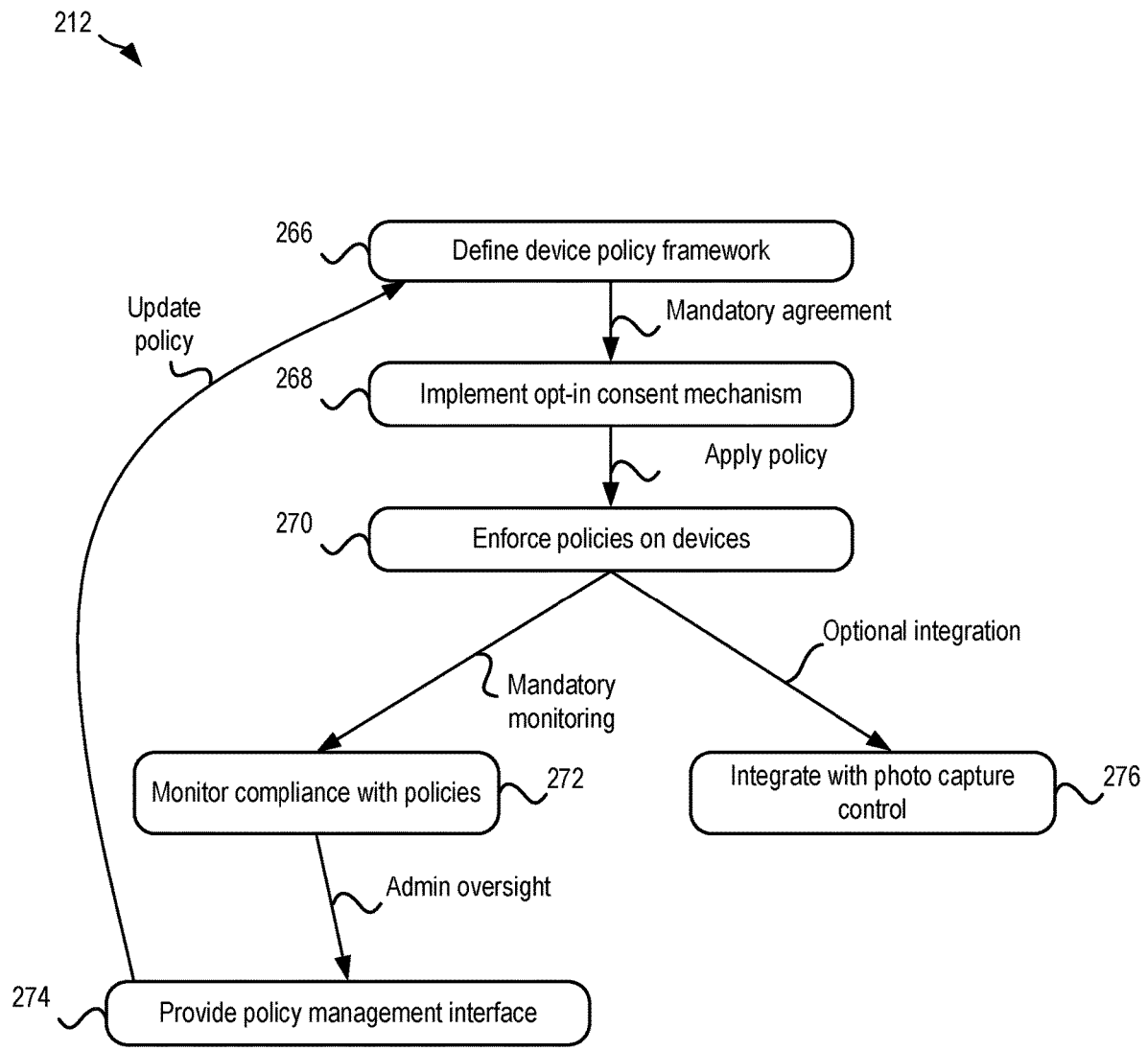
FIG. 2E is a flowchart of sub-operations of an operation of the flowchart of FIG. 2A, in accordance with one embodiment of the present invention.

Looking to FIG. 2E, exemplary sub-operations of enabling a predetermined machine learning model to use the collected data to determine whether the first user device is authorized to perform an image capture at a current location of the first user device are illustrated in accordance with one embodiment, one or more of which may be used to perform decision 212 of FIG. 2A (and logical paths leading therefrom). However, it should be noted that the sub-operations of FIG. 2E are illustrated in accordance with one embodiment which is in no way intended to limit the invention.

In some approaches, in order for the predetermined machine learning model to be provided with data used to make the determinations described herein, a device policy framework may be defined, e.g., see sub-operation 266. In some approaches, in order to define this framework, a policy framework for devices is established that includes restrictions for photo capture in secured areas. An opt-in consent mechanism is preferably also enabled, e.g., see sub-operation 268. As described elsewhere herein, this consent mechanism may be enabled by implementing a user consent process that requires users to optionally agree to the policy restrictions on their devices to remain in compliance. Thereafter, policies may be enforced on user devices that opt-in, e.g., see sub-operation 270. For example, the defined policies may be applied on user devices based on roles, responsibilities, and physical location of the user devices, as determined by the other system components and/or data collected from such components.

The policies may be integrated with photo capture control in sub-operation 276. Furthermore, the data may be monitored for determining a relative compliance, and the photo capture control components may be caused to enable or disable photo capture functionalities based on the enforced policies. This monitoring preferably includes real-time monitoring to ensure that device usage complies with the defined policies and consent agreements, e.g., see sub-operation 272. A predetermined policy management interface may be provided, e.g., see sub-operation 274, that is an administrative interface for managing and updating the device policies, and monitoring user compliance may be included in infrastructure that supports the sub-operations described above. This infrastructure may additionally and/or alternatively include APIs such as mobile device management (MDM) APIs and device control APIs to enforce policies. This infrastructure enforces predetermined IT standards in that legal and industry standards regarding user consent, data privacy, and security, such as GDPR for consent management, are always complied with.

Various use cases in which the techniques of embodiments and approaches described herein may be deployed are described below.

In a first use case, the first user may be a lab technician at a biotech company. Work responsibilities of the first user may include taking authorized photos of experiments and samples for documentation and record-keeping purposes. The techniques described herein enable the first user to capture photos using a first user device in secured areas while ensuring compliance with company policies and security protocols. For example, using one or more of the SOD matrix, location services, and machine learning algorithms, the techniques described herein ensure that the first user is granted access to features on the first device based on roles and responsibilities associated with the user. This way, the first user is allowed to capture the photos that the first user needs within the specific space of the lab where the first user has access. For other parts of the lab, e.g., a second predetermined secure area, the first user and the first user device are restricted from performing photo captures based on the established policies.

Another use case of the techniques described herein may occur based on a visitor in a manufacturing space. For example, the visitor may tour the manufacturing space and attempt to take photos of sensitive equipment and processes that occur within the manufacturing space. Deploying the techniques described herein, a user device associated with the visitor may ask the visitor to opt-in to a policy by downloading and accepting a predetermined application that is mandatory for visitors of the manufacturing space to opt-in to. Thereafter, the techniques described elsewhere above may be applied, e.g., via the application, to detect and prevents the visitor from using the device to take unauthorized photos within the manufacturing space. This ensures that confidential information and assets within the manufacturing space are protected. For example, in response to a determination that the visitor attempts to open a camera application of the device (forgetting about the policy to not perform photo captures in the manufacturing space), the application does not allow the visitor to open their camera application within the manufacturing space.

In yet another use case of the techniques described herein, a pharmaceutical company may have sensitive research and development areas at headquarters of the company. The techniques described herein may provide a secure and scalable solution for managing and securing photo capture in these sensitive areas by ensuring compliance with company policies and security protocols. More specifically, the techniques described herein may be used to ensure that unauthorized user devices are not allowed to perform photo captures in these areas. With the ability to integrate with existing IT infrastructure and enabling technologies, the techniques described herein are ideal for organizations that rely on confidentiality and security to protect assets, intellectual property, and customer data.

Figure 3:
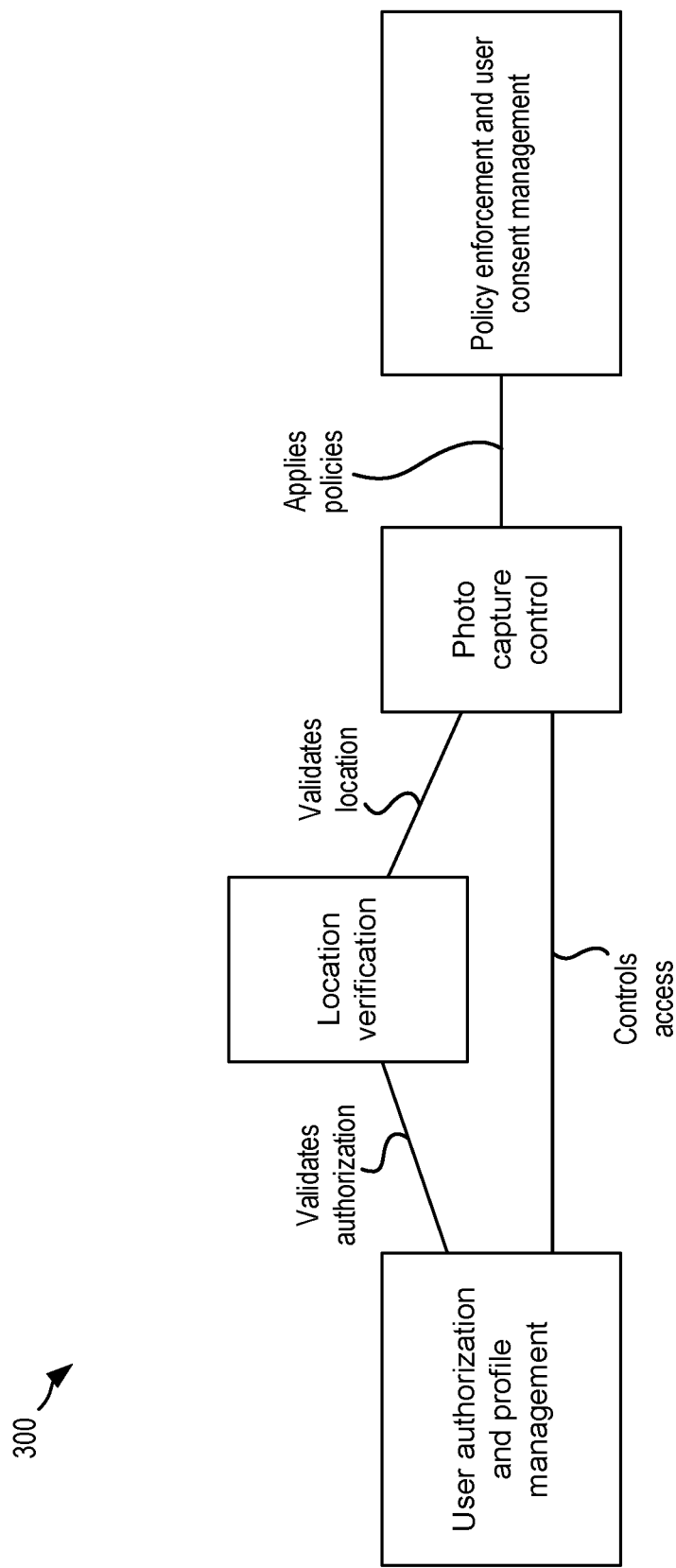
FIG. 3 is a computational infrastructure, in accordance with one embodiment of the present invention.

FIG. 3 depicts a computational infrastructure 300 associated with enacting a policy for preventing unauthorized photo capture in sensitive areas, in accordance with one embodiment. As an option, the present computational infrastructure 300 may be implemented in conjunction with features from any other embodiment listed herein, such as those described with reference to the other FIGS. Of course, however, such computational infrastructure 300 and others presented herein may be used in various applications and/or in permutations which may or may not be specifically described in the illustrative embodiments listed herein. Further, the computational infrastructure 300 presented herein may be used in any desired environment.

The computational infrastructure 300 includes a plurality of modules that may be used to enact the policy described elsewhere herein, e.g., see method 200. For example, the computational infrastructure 300 includes a user authorization and profile management module that is configured to perform one or more of the sub-operations described in the flowchart of FIG. 2B. More specifically, the user authorization and profile management module manages user roles, responsibilities, and access rights based on the Separation of Duties (SOD) matrix. Furthermore, the user authorization and profile management module may be used to determine who is authorized to take photographs in specific secured areas. The user authorization and profile management module related to other modules in that it serves as the foundation for access control, interacting directly with the location verification and photo capture control components to ensure proper permissions are granted. In some approaches, the user authorization and profile management module may be used to manage role-based access control, user profiles, authentication, etc.

The user authorization and profile management module may be used with a location verification module for validating authorizations of a given user and/or user device. The location verification module validates the physical location of users and/or associated user devices to ensure they are in authorized areas for photo capture. The location verification module uses multiple means to validate the location to prevent false reporting. Furthermore, the location verification module relates to other modules in that it works in conjunction with user authorization to provide the right access based on location and interacts with photo capture control to allow or disallow photo capture. The location verification module may be configured to perform one or more of the sub-operations described in the flowchart of FIG. 2C. In some approaches, the location verification module may be used to perform GPS verification, SSID location tracking, multi-factor verification, etc. The user authorization and profile management module and/or the location verification module may be used with a photo capture control module to validate locations and/or control access. The photo capture control module controls the ability to capture photos on various devices such as smartphones, smart glasses, and traditional cameras based on user authorization and location. The photo capture control module relates to other modules in that it receives inputs from the user authorization and location verification components and controls the devices through a policy enforcement and user consent management component. Furthermore, the photo capture control module may be configured to perform one or more of the sub-operations described in the flowchart of FIG. 2D and/or other operations including management of device management APIs, management of vital containerization, and performance of real-time monitoring.

The policy enforcement and user consent management module may be configured to perform one or more of the sub-operations described in the flowchart of FIG. 2E in order to perform mobile device management, management of user consent frameworks, and encryption. The policy enforcement and user consent management module manages policies on devices and ensures that users are in agreement with the restrictions through opt-in consent. This enables different types of usages on or off company property in some use case deployments. The policy enforcement and user consent management module relates to other modules described herein by serving as the enforcement arm of the system, applying the policies defined by the user authorization and controlled by the photo capture control module.

Now referring to FIG. 4, a flowchart of a method 400 is shown according to one embodiment. The method 400 may be performed in accordance with the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the flowchart in FIG. 4 illustrates illustritive interactions between each of the modules of FIG. 3 in order to enact a policy for selectively preventing photo capture in predetermined secure areas. For example, operation 402 of method 400 includes causing the user authorization and profile management module to validate user role(s) of a user and/or user device that may enter a predetermined secure area. A location verification request may be exchanged between the user authorization and profile management module and a location verification module, e.g., see operation 404. In order to perform such a verification, in some approaches, the location verification module may verify GPS and/or SSID information, e.g., see operation 406, and optionally returns a location verification to the user authorization and profile management module, e.g., see operation 408.

Operation 410 includes checking photo capture rights of the user and/or user device with a photo capture control module. The photo capture control module may be configured to apply a predetermined policy based on an authorization being performed, e.g., see operation 412. Operation 414 includes enforcing the policy and ensuring that consent from the user associated with the photo capture is obtained. Provided that such consent is obtained, the policy may be applied using one or more of the techniques described elsewhere herein, e.g., see operation 416. As a result of applying the policy access to a predetermined application feature, e.g., a camera of a user device, may be granted or denied, e.g., see operation 418.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
    enacting a first policy for preventing unauthorized photo capture in sensitive areas, wherein enacting the first policy includes:
        collecting location data and camera data for a first user device, wherein the first user device is associated with a user profile of a first user;
        causing a predetermined machine learning model to use the location data and the camera data to determine whether the first user device is authorized to perform an image capture at a current location of the first user device;
        in response to a determination that an output of the predetermined machine learning model indicates that the first user device is not authorized to perform the image capture at the current location of the first user device, restricting the first user device from performing the image capture; and
        in response to a determination that the output of the predetermined machine learning model indicates that the first user device is authorized to perform the image capture at the current location of the first user device, allowing the first user device to perform the image capture.

2. The CIM of claim 1, wherein the location data and the camera data are captured, using an application installed on the first user device, wherein the location data is selected from the group consisting of: a geographical position system (GPS) location of the first user device, a location of the first user device within a predetermined building, and a location of the first user device with respect to a predetermined object of a predetermined secure process.

3. The CIM of claim 1, wherein the camera data is selected from the group consisting of: whether the first user device is currently being touched by the first user, whether an application of a predetermined type is open on the first user device, and whether a display of the first user device is on.

4. The CIM of claim 1, wherein enacting the first policy includes: collecting behavior data associated with the first user; and causing the predetermined machine learning model to use the behavior data to determine whether the first user device is authorized to perform the image capture, wherein the behavior data details a degree that the first user complies with predetermined policies of a predetermined company.

5. The CIM of claim 4, wherein enacting the first policy includes: determining a first weight for the location data; determining a second weight for the camera data; determining a third weight for the behavior data, wherein each of the weights are different from one another; and causing the predetermined machine learning model to apply the weights to the different types of data for determining whether the first user device is authorized to perform the image capture.

6. The CIM of claim 4, wherein enacting the first policy includes: in response to a determination that the current location of the first user device is within a predetermined proximity to a first secure area, outputting an invitation for enrolling the first user device with the first policy; in response to a determination that the first user device is enrolled with the first policy, allowing the first user device within the first secure area; and in response to a determination that the first user device is not enrolled with the first policy, preventing the first user device to enter within the first secure area.

7. The CIM of claim 1, wherein enacting the first policy includes: maintaining a separation of duties (SOD) matrix for a plurality of users including the first user, wherein the separation of duties matrix defines user roles and authorized responsibilities on a task by task basis for the plurality of users; and causing the predetermined machine learning model to use the SOD matrix for determining whether the first user device is authorized to perform the image capture.

8. The CIM of claim 1, wherein determining whether the first user device is authorized to perform the image capture at the current location of the first user device includes: tracking progress of a predetermined process that occurs within a first secure area, wherein the first user device is allowed to perform the image capture during a first portion of the predetermined process in response to the determination that the output of the predetermined machine learning model indicates that the first user device is authorized to perform the image capture at the current location, wherein the first user device is not allowed to perform the image capture during a remaining portion of the predetermined process.

9. The CIM of claim 1, wherein determining whether the first user device is authorized to perform the image capture at the current location of the first user device includes: in response to a determination that the current location of the first user device is in an unrestricted area, allowing the first user device to perform the image capture, wherein restricting the first user device from performing the image capture includes causing blurring to be applied to a background of an image displayed on a display of the first user device.

10. A computer program product (CPP), the CPP comprising:
    a set of one or more computer-readable storage media;
    program instructions, collectively stored in the set of one or more storage media, for causing a processor set to perform the following computer operations:

enact a first policy for preventing unauthorized photo capture in sensitive areas, wherein enacting the first policy includes:
  collecting location data and camera data for a first user device, wherein the first user device is associated with a user profile of a first user;
  causing a predetermined machine learning model to use the location data and the camera data to determine whether the first user device is authorized to perform an image capture at a current location of the first user device;
  in response to a determination that an output of the predetermined machine learning model indicates that the first user device is not authorized to perform the image capture at the current location of the first user device, restricting the first user device from performing the image capture; and
  in response to a determination that the output of the predetermined machine learning model indicates that the first user device is authorized to perform the image capture at the current location of the first user device, allowing the first user device to perform the image capture.

11. The CPP of claim 10, wherein the location data and the camera data are captured, using an application installed on the first user device, wherein the location data is selected from the group consisting of: a geographical position system (GPS) location of the first user device, a location of the first user device within a predetermined building, and a location of the first user device with respect to a predetermined object of a predetermined secure process.

12. The CPP of claim 10, wherein the camera data is selected from the group consisting of: whether the first user device is currently being touched by the first user, whether an application of a predetermined type is open on the first user device, and whether a display of the first user device is on.

13. The CPP of claim 10, wherein enacting the first policy includes: collecting behavior data associated with the first user; and causing the predetermined machine learning model to use the behavior data to determine whether the first user device is authorized to perform the image capture, wherein the behavior data details a degree that the first user complies with predetermined policies of a predetermined company.

14. The CPP of claim 13, wherein enacting the first policy includes: determining a first weight for the location data; determining a second weight for the camera data; determining a third weight for the behavior data, wherein each of the weights are different from one another; and causing the predetermined machine learning model to apply the weights to the different types of data for determining whether the first user device is authorized to perform the image capture.

15. The CPP of claim 13, wherein enacting the first policy includes: in response to a determination that the current location of the first user device is within a predetermined proximity to a first secure area, outputting an invitation for enrolling the first user device with the first policy; in response to a determination that the first user device is enrolled with the first policy, allowing the first user device within the first secure area; and in response to a determination that the first user device is not enrolled with the first policy, preventing the first user device to enter within the first secure area.

16. The CPP of claim 10, wherein enacting the first policy includes: maintaining a separation of duties (SOD) matrix for a plurality of users including the first user, wherein the separation of duties matrix defines user roles and authorized responsibilities on a task by task basis for the plurality of users; and causing the predetermined machine learning model to use the SOD matrix for determining whether the first user device is authorized to perform the image capture.

17. The CPP of claim 10, wherein determining whether the first user device is authorized to perform the image capture at the current location of the first user device includes: tracking progress of a predetermined process that occurs within a first secure area, wherein the first user device is allowed to perform the image capture during a first portion of the predetermined process in response to the determination that the output of the predetermined machine learning model indicates that the first user device is authorized to perform the image capture at the current location, wherein the first user device is not allowed to perform the image capture during a remaining portion of the predetermined process.

18. The CPP of claim 10, wherein determining whether the first user device is authorized to perform the image capture at the current location of the first user device includes: in response to a determination that the current location of the first user device is in an unrestricted area, allowing the first user device to perform the image capture, wherein restricting the first user device from performing the image capture includes causing blurring to be applied to a background of an image displayed on a display of the first user device.

19. A computer system (CS), the CS comprising:
  a processor set;
  a set of one or more computer-readable storage media;
  program instructions, collectively stored in the set of one or more storage media, for causing the processor set to perform the following computer operations:
  enact a first policy for preventing unauthorized photo capture in sensitive areas, wherein enacting the first policy includes:
    collecting location data and camera data for a first user device, wherein the first user device is associated with a user profile of a first user;
    causing a predetermined machine learning model to use the location data and the camera data to determine whether the first user device is authorized to perform an image capture at a current location of the first user device;
    in response to a determination that an output of the predetermined machine learning model indicates that the first user device is not authorized to perform the image capture at the current location of the first user device, restricting the first user device from performing the image capture; and
    in response to a determination that the output of the predetermined machine learning model indicates that the first user device is authorized to perform the image capture at the current location of the first user device, allowing the first user device to perform the image capture.

20. The CS of claim 19, wherein the location data and the camera data are captured, using an application installed on the first user device, wherein the location data is selected from the group consisting of: a geographical position system (GPS) location of the first user device, a location of the first user device within a predetermined building, and a location of the first user device with respect to a predetermined object of a predetermined secure process.

* * * * *